(12) United States Patent
Lanter et al.

(10) Patent No.: US 8,558,684 B2
(45) Date of Patent: *Oct. 15, 2013

(54) BELT LOCK WITH A MEANS FOR DETECTING THE LOCKING STATUS

(75) Inventors: Joshua Lanter, Chur (CH); Clau Lombriser, Trun (CH)

(73) Assignee: Polycontact AG, Chur (CH)

( * ) Notice: Subject to any disclaimer, the term of this patent is extended or adjusted under 35 U.S.C. 154(b) by 432 days.

This patent is subject to a terminal disclaimer.

(21) Appl. No.: 12/897,264

(22) Filed: Oct. 4, 2010

(65) Prior Publication Data
US 2011/0084827 A1    Apr. 14, 2011

(30) Foreign Application Priority Data

Oct. 8, 2009   (CH) ........................................ 1554/09

(51) Int. Cl.
*B60Q 1/00*    (2006.01)
*E05B 45/06*   (2006.01)
*A41F 1/00*    (2006.01)

(52) U.S. Cl.
USPC ................... 340/457.1; 340/426.28; 340/542; 340/686.4; 200/61.72; 200/547; 200/85 A; 24/572.1; 24/579.09

(58) Field of Classification Search
USPC ...................................................... 340/457.1
See application file for complete search history.

(56) References Cited

U.S. PATENT DOCUMENTS

| 5,406,252 A * | 4/1995 | Dear .......................... 340/457.1 |
| 7,148,809 B2 * | 12/2006 | Enomoto et al. ........... 340/686.1 |
| 7,538,283 B2 * | 5/2009 | Muromachi ........... 200/61.58 B |

FOREIGN PATENT DOCUMENTS

| EP | 0 861 763 A2 | 9/1998 |
| EP | 1 025 774 B1 | 7/2004 |

* cited by examiner

*Primary Examiner* — Donnie Crosland
(74) *Attorney, Agent, or Firm* — Buchanan Ingersoll & Rooney PC

(57) ABSTRACT

A belt lock for a seat belt equipped with a locking mechanism that is arranged in a belt lock housing. The locking mechanism has a component that changes its location from a first end position into a second end position and detects a locking status. In the actuation of the locking mechanism, the component that changes its location interacts with the detector of the locking status. The locking status is detected by an electromechanical switch that is arranged in the vicinity of the component that changes its location and can be actuated upon its movement from the first into the second end position.

20 Claims, 2 Drawing Sheets

BELT LOCK WITH A MEANS FOR DETECTING THE LOCKING STATUS

RELATED APPLICATION

This application claims priority under 35 U.S.C. §119 to Swiss Patent Application No. 01554/09 filed in Switzerland on Oct. 8, 2009, the entire content of which is hereby incorporated by reference in its entirety.

FIELD

The disclosure relates to a belt lock for a seat belt, for example in an automobile, and to detecting the locking status.

BACKGROUND INFORMATION

In technical applications, such as, for example, automobile construction and the like, it can be necessary to quickly and reliably detect the location of a component that can be moved into two end positions relative to a stationary part, using measurement element technology. In the case of a belt lock of an automobile, it can be checked, for example, whether a passenger is belted or not. Knowledge of the locking status of the belt lock is useful to notify a passenger by a signal to put on and fasten the seat belts. Since the introduction of airbags, information about the locked state of the seat belts has also been useful for activating or deactivating mechanisms for inflating driver and passenger airbags or side and head airbags.

For example, in known applications, there are Hall sensors for contactless monitoring of the components that change their location, for example, ones that can assume two different end positions. Hall sensors can include a semiconductor layer supplied with a constant current, in a known integrated construction. A magnetic field component perpendicular to the semiconductor layer can influence the constant current, and the sensor delivers a Hall voltage that can be evaluated, tapped and used to evaluate a status, or that can be used directly as a switching voltage. The integrated construction of Hall sensors can make it possible to integrate an evaluation circuit that is suitable for evaluation of the switching status on the Hall sensor. In the automotive industry, therefore, Hall sensors can be used as contactless status sensors in many applications.

EP-A-0 861 763 discloses, for example, a belt lock with an integrated, pretensioned Hall sensor that without contact detects the status of a locking body or an ejector for a lock tongue that has been inserted into the belt lock. Here, a Hall sensor with a Hall field can be arranged in direct proximity to a permanent magnet. Changing the location of the locking body and of the ejector that includes a ferromagnetic material for this purpose changes the magnetic field of the permanent magnet. In doing so, the signal of the Hall sensor changes and at the output of the Hall sensor, the status change can be tapped as a voltage change. In one embodiment, it is suggested that the Hall sensor with a Hall field be installed without a permanent magnet, and the locking body or the ejector be designed as a permanent magnet for this purpose. In this arrangement, the change in the location of the locking body or of the ejector will also be detectable by a change of the Hall voltage.

With the belt lock according to EP-A-0 861 763, the Hall sensor must be positioned very carefully with reference to the locking element or the ejector. Subsequent installation of the Hall sensor is therefore relatively complex and expensive. Depending on its arrangement, the Hall sensor can also be sensitive to external stray electromagnetic fields that can be caused by, for example, a magnetic key ring. Optionally, even additional shielding must be mounted. This further complicates the structure or the installation. The susceptibility to external stray fields can also be increased by the signal changes being relatively small due to the relatively short paths that must be traversed by the locking body or the ejector when the seat belt lock is locked or unlocked. The seat belt variant without a pretensioned Hall sensor in which either the locking body or the ejector is designed as a permanent magnet is also less practicable. The attainable signal changes are also relatively small here. This can make it difficult to detect different states, for example, the belt lock locked or unlocked. Vibrations of the locking body and of the ejector during locking and unlocking of the seat belt can cause demagnetization of the permanent magnet with time. This can ultimately lead to the Hall sensor becoming ineffective and the status changes of the belt lock no longer being able to be reliably detected.

The known belt locks can have a compact design that therefore can seriously limit the available space within the belt lock. This makes it difficult to arrange sensor components within the belt lock housing, especially in the vicinity of the component that changes its location from one end position into the other end position when the belt lock is actuated. If shields are also to be attached, the engineer can be faced with an essentially insoluble problem because the dimensions of the belt lock housing are not to be changed.

SUMMARY

A belt lock for a seat belt is disclosed which includes a locking mechanism arranged in a belt lock housing for actuation when a belt lock tongue is inserted into the belt lock, the locking mechanism having a component that changes location from a first end position into a second end position upon actuation. Means for detecting a locking status interacts with the component that changes location. The means for detecting a locking status is an electromechanical switch that is arranged in a vicinity of the component that changes location, for actuation upon movement of the component from the first end position into the second end position.

BRIEF DESCRIPTION OF THE DRAWINGS

Other advantages and features of the disclosure will become apparent from the following description of schematics of one embodiment of the device according to the disclosure.

DETAILED DESCRIPTION

Figure 1:
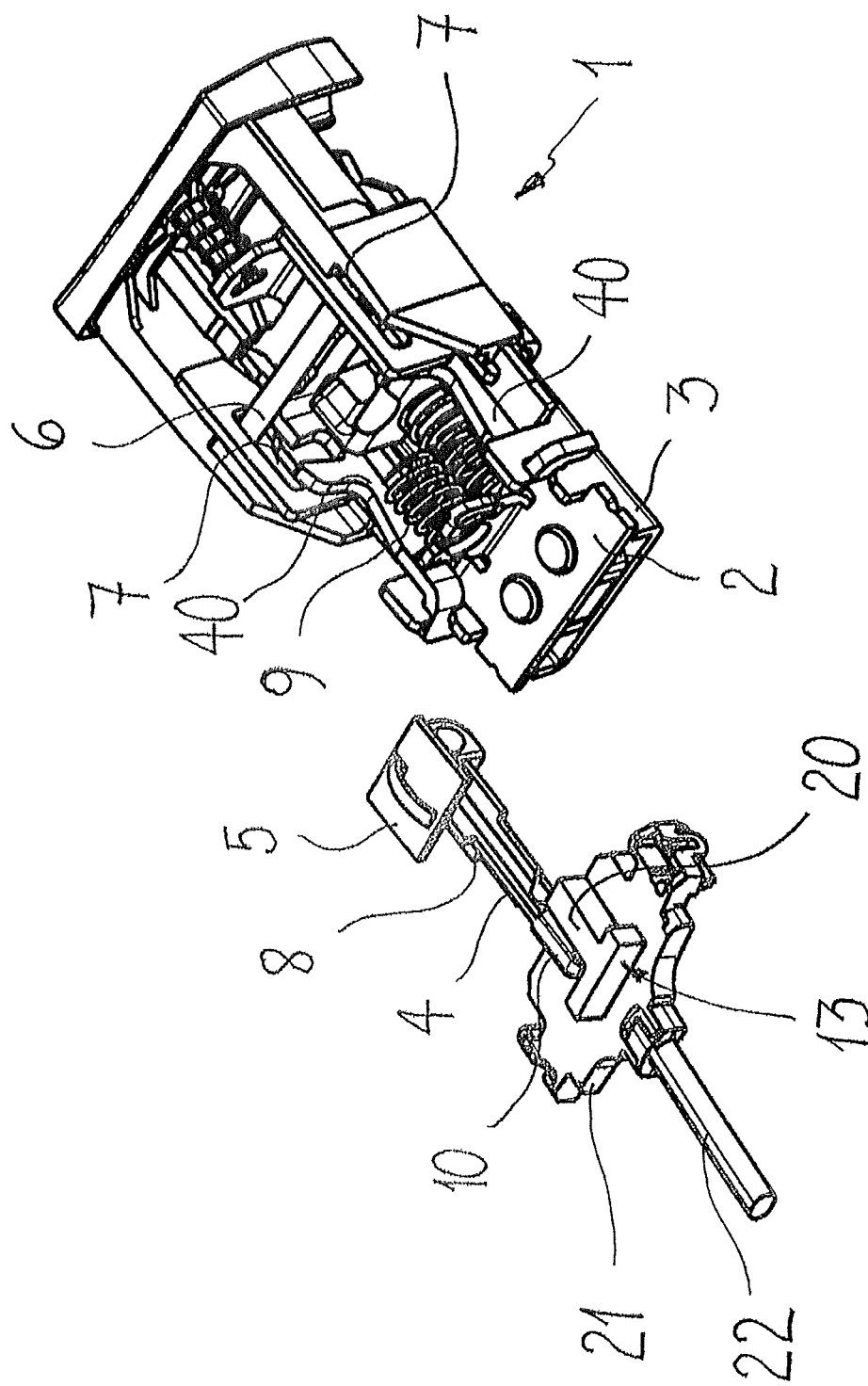
FIG. 1 shows a partially pulled-apart perspective view of a belt lock according to an exemplary embodiment of the disclosure without the belt lock housing.

The disclosure relates to a belt lock whose locking status can be easily and reliably ascertained. The belt lock can be equipped with a means for detecting the locking status that can be insensitive to stray and disruptive magnetic fields. The dimensions of the belt lock housing can be kept unchanged. Simple and economical installation can be made possible, which also promotes retrofitting of existing belt lock systems of varied designs.

The disclosure relates to a belt lock for a seat belt that is equipped with a locking mechanism that is arranged in a belt lock housing. The locking mechanism has a component that changes its location from a first end position into a second end position upon its actuation and a means for detecting the locking status. In the actuation of the locking mechanism, the component that changes its location interacts with the means for detecting the locking status. The means for detecting the locking status can be an electromechanical switch that can be located in the vicinity of the component that changes its location and can be actuated upon its movement from the first into the second end position.

The belt lock proposed by the disclosure can be equipped with an electromechanical switch that has a very simple and space-saving structure. The component that changes its location interacts directly with the electromechanical switch. This can prevent malfunctions as a result of the connections of the switching elements to the moving part being incomplete or becoming loose.

The electrical switch can be, for example, a mini-switch or a micro-switch and can be relatively insensitive to mechanical stresses. For example, the electromechanical switch can be insensitive to disruptive magnetic fields. Thus, additional shielding and the like can be omitted. Design modifications on the seat belt housing are not necessary due to the very compact construction of the electromechanical switch.

In an exemplary embodiment of the disclosure, the electromechanical switch can be arranged in the vicinity of a clamp arm of a clamp-like locking element that can be pivoted around a pivoting axis that runs perpendicular to an insertion direction for a belt clip. When the locking mechanism is actuated, the locking element pivots out of a first (open) end position into a second (locked) end position, in which it locks the inserted belt clip. In an exemplary embodiment of the disclosure, the component that changes its location can be a mandrel that can be moved axially when the locking mechanism is actuated.

The electromechanical switch can be arranged laterally to the path of motion of the axially movable mandrel or the clamp arm. Here, the axially movable mandrel or the clamp arm along its lengthwise extension has means that when it moves cause actuation of the electromechanical switch. The axially movable mandrel or the clamp arm directly forms a mechanical actuator for the electromechanical switch without itself forming a component of the electrical switching system. In this way, the mechanical components for the electromechanical switch and for its actuation can be limited to the necessary minimum.

In another exemplary embodiment of the belt lock, the axially movable mandrel in the region of its free end can have a lateral bevel that faces the electromechanical switch and that in its axial movement interacts with a cam or an operating projection of the electromechanical switch. For example, the mandrel widens in the direction of its free end in its width.

In one mechanically structural variant, the electromechanical switch includes two contact sheets that run roughly parallel in the vicinity of one another, one of the contact sheets that is facing the mandrel or the clamp arm being elastically supported to be able to move and having an operating projection on which, for example, the lateral bevel of the mandrel acts.

One exemplary embodiment of the disclosure can include the electromechanical switch to be designed as a normally open (N/O) contact. In the status not loaded by the mandrel or clamp arm, the electromechanical switch is opened, and the electrical contact is interrupted. By moving the mandrel or the clamp arm when the fastener mechanism is actuated the electromechanical switch and thus the electrical circuit are closed.

Another exemplary embodiment of the belt lock according to the disclosure can include the axially movable mandrel or clamp arm to have a laterally projecting cam that is arranged along its lengthwise extension, for example in the region of its free end. The laterally projecting cam interacts with two contact sheets of the electromechanical switch that can be arranged laterally to the path of motion.

In another exemplary embodiment of the belt lock, the electromechanical switch can be designed as an N/O contact. Here, the contact sheet on which the cam acts when the mandrel or the clamp arm is moved is elastically pretensioned relative to the second contact sheet in the opening direction. In the status that is not loaded by the laterally projecting cam, the electromechanical switch is opened, and electrical contact is interrupted. By moving the mandrel or the clamp arm when the fastener mechanism is actuated the electromechanical switch and thus the electrical circuit can be closed.

One exemplary embodiment of the belt lock according to the disclosure calls for the electromechanical switch to be designed as a normally closed (N/C) contact. Here, at least one of the two contact sheets can be elastically pretensioned in the closing direction relative to the second contact sheet. The cam projecting laterally from the mandrel protrudes into an intermediate space between the two contact sheets. In the initial state, the cam does not act on either of the two contact sheets, and the two contact sheets touch one another and thus close the circuit. When the mandrel or the clamp arm moves from the first into the second end position the cam slides between the two contact sheets such that they are pressed apart. As a result, the circuit can be interrupted.

To protect the electrically contacted contact sheets against a short circuit, in another exemplary embodiment of the disclosure, the electromechanical switch can be arranged in a switch housing.

One use of a belt lock that is equipped according to the disclosure can include generating an optical and/or acoustic warning signal for the passengers, for example of an automobile, to fasten their seat belts. Furthermore, the belt lock that can be equipped according to the disclosure can be used for the activation or deactivation of mechanisms for inflating airbags for the passengers of an automobile.

The belt lock shown in FIG. 1 in a partially pulled-apart perspective view corresponds largely to the belt lock shown in EP-1 025 774 B1 using FIGS. 1-6 the entire contents of which are hereby incorporated by reference. The following description of the disclosure is therefore limited to the components of the belt lock that are important to the understanding exemplary embodiments of the disclosure.

Figure 2:
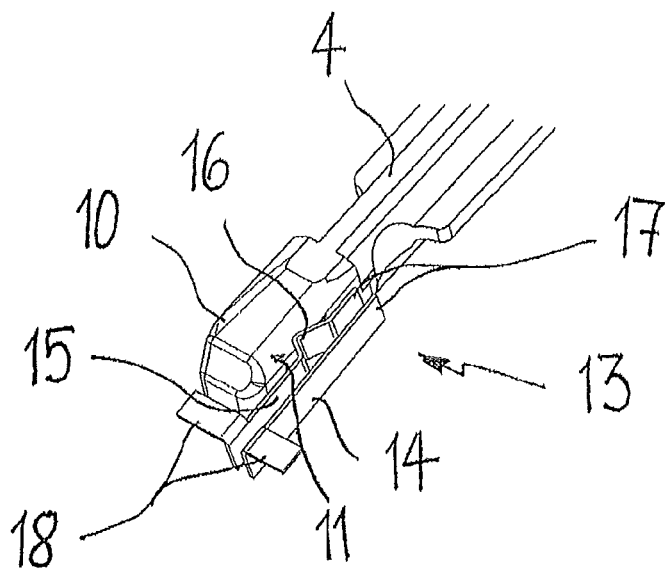
FIGS. 2-4 show three exemplary embodiments of the disclosure of means for detecting the locking status of the belt lock.

FIGS. 1 and 2 show the belt lock in each case without the belt lock housing. For example, the belt lock housing includes two housing shells that can be screwed to one another or can be bonded to one another in any suitable manner. A fastener frame of the belt lock is provided with the reference number 1 as a whole. The fastener frame 1 is composed of an upper and a lower plate 2, 3 that can be connected to one another by connecting pins 4. Between the upper and lower plates 2, 3, a guide channel remains open into which a metallic clip of the seat belt can be inserted (not shown). The locking mechanism includes a clamp-like locking element 40 that can be pivoted around a pivoting axis and upon actuation can be moved out of a first (open) end position into a second (locked) end position in which it locks the inserted belt clip. In FIG. 1, the clamp-like locking element 40 is indicated by its two lateral clamp arms. The locking mechanism and an ejector can be mounted on the fastener frame 1 or on the two plates 2, 3 and will not be explained in more detail here.

The locking mechanism includes a rod-shaped mandrel 4 whose one end has an engagement part 5. The engagement part 5 acts on a locking pin 6 that in the locking position secures a locking element that is not shown in more detail. The locking pin 6 is guided lengthwise in slot guides 7 in the frame. The slot guides 7 run essentially parallel to the guide channel for the belt clip. The rod-shaped mandrel 4 can be inserted through a pretensioning spring 9 that is designed as a helical compression spring. The pretensioning spring 9 can be supported, on the fastener frame 1, and on one shoulder 8 of the rod-shaped mandrel 4 and pretensions the locking pin 6 by way of the engagement part 5. The mandrel 4 can be used at the same time as a guide for the pretensioning spring 9 that thus retains its linear alignment in each displacement position of the locking pin 6. When the fastener mechanism is actuated, the locking pin 6 can be pushed forward and backward in the slot guides against the spring force of the pretensioning spring. By way of the engagement part 5, the mandrel 4 follows the axial displacement motion of the locking pin 6 and can thus be pushed axially out of the first end position into the second end position and vice versa for each actuation of the fastening mechanism.

With its lengthwise end 10 that is opposite the engagement part 5, the mandrel 4 is in the vicinity of the means for detecting (e.g., a switch as disclosed herein) the locking status that is provided with the reference number 13 as a whole. The means for detecting the locking status 13 is housed within a switch housing 20 that is mounted on an end piece 21. The end piece 21 can be permanently joined to the frame 1 of the belt lock and is arranged on the end of an anchor 22 via which the belt lock can be screwed, for example, to a frame part of an automobile. On its side facing the axially movable mandrel 4, the switch housing 20 is made open so that the mandrel 4 can interact with the means for detecting the locking status 13. In an exemplary embodiment of the disclosure, the mandrel can also be guided spatially by the switch housing in order to ensure more exact movement of the mandrel and to achieve an accurate operating point. For example, greater production tolerances can be compensated in this way.

Figure 3:
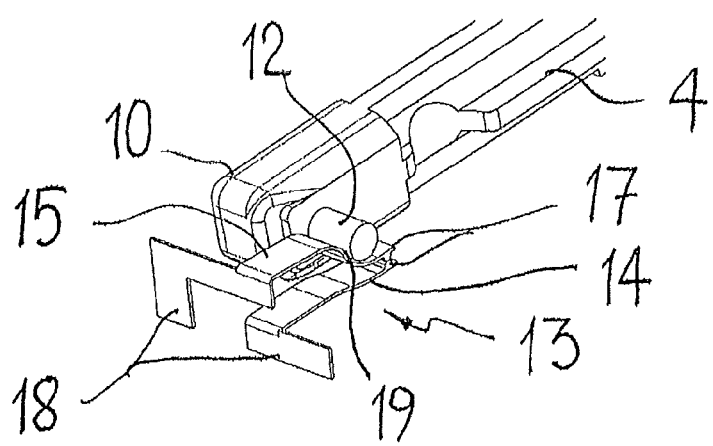
Figure 4:
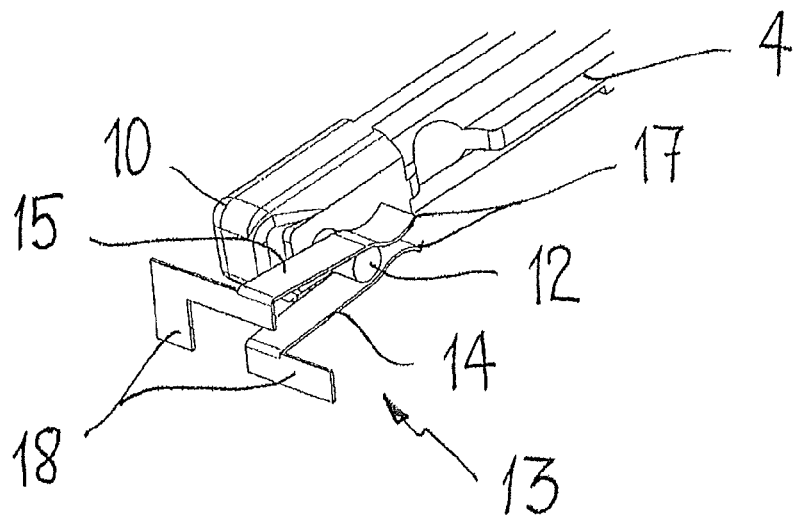

FIGS. 2 to 4 show schematics of different exemplary embodiments of the means for detecting the locking status 13 of the belt lock, which can be actuated in the example of the mandrel 4 that can be axially moved when the locking mechanism is actuated. The means for detecting the locking status 13 can be designed in each case as an electromechanical switch that has two contact sheets 14, 15. The electromechanical switches can be designed as N/O contacts (FIGS. 2 and 3) or as N/C contacts (FIG. 4).

In the electromechanical switch 13 that is shown in FIG. 2, the two contact sheets 14, 15 can be arranged running roughly parallel to one another, laterally to the displacement path of the mandrel 4. The contact sheet 15 facing the mandrel 4 can be supported elastically to be able to move and has an operating projection 16 that laterally adjoins the mandrel 4. The mandrel 4 has a side surface 11 that runs obliquely toward its free end section 10 and that interacts with the operating projection 16. The oblique surface 11 leads to a widening of the mandrel 4 on its free end section 10. In this way, when the mandrel 4 is moved axially, the movable contact sheet 15 can be pressed against the second contact sheet 14 until the contact regions 17 of the sheets 14, 15 touch one another and close the circuit. If the mandrel 4 is pushed back again into its initial position, the operating projection 16 slides along the oblique surface 11, and the movably supported contact sheet 15 springs back into its initial position in which the circuit can be interrupted.

FIG. 3 shows an electromechanical switch 13 whose two contact sheets 14, 15 can be arranged lying on top of one another, running roughly parallel to one another laterally to the displacement path of the mandrel 4. A cam 12 projects from the side surface of the mandrel 4 and presses against the upper contact sheet 15. The upper contact sheet 15 has a ramp 19 against which the cam 12 strikes when the mandrel 4 is displaced. In this way, the contact sheets with their contact regions 17 can be pressed together, and the circuit can be closed. If the mandrel 4 is pushed back again into its initial position, the upper sheet 15 springs back into its initial position, and the circuit can be interrupted again.

FIG. 4 shows an electromechanical switch 13 that is designed as an N/C contact with two elastically resilient contact sheets 14, 15 that can be arranged on top of one another, running roughly parallel to one another laterally to the displacement path of the mandrel 4. The free ends of the contact sheets 14, 15 provided with contact regions 17 can be elastically pretensioned against one another. A cam 12 projecting from the side surface of the mandrel 4 protrudes into the intermediate space between the two contact sheets 14, 15 and in one end position of the mandrel presses the contact regions 17 of the two contact sheets 14, 15 apart so that the circuit can be interrupted. If the mandrel 4 is pushed axially into its second end position—in the illustrated exemplary embodiment in the direction of its free end 10—the cam 12 can slide into a region in which the two contact sheets 14, 15 have a greater distance from one another. In this way, the free ends of the contact sheets 14, 15 that are elastically pretensioned against one another can move toward one another until their contact regions 17 touch one another and the circuit can be closed.

The ends 18 of the contact sheets 14, 15 of the electromechanical switch 13 of the embodiments according to FIGS. 2-4, which ends face away from the contact regions 17, can be used to make contact. This can take place, for example, positively or integrally.

The interaction of the electromechanical switch with a component that can move its location from a first into a second end position when the locking mechanism is actuated was explained using the example of the axially movable mandrel. In an exemplary embodiment of the disclosure, the electromechanical switch can also be arranged in the vicinity of one of the two clamp arms of the pivotable locking element 40 of the fastener mechanism. Here, the spatial arrangement of the examples of the electromechanical switch that were explained using FIGS. 2-4 takes into account the adjustment motion of the clamp arm that is offset by 90° relative to the axially movable mandrel.

The information about the status of the belt lock that is obtained by the respective electromechanical switch can be used for, for example, a belt warning indicator by an optical and/or acoustic warning signal being produced depending on the detected belt status, which communicates to the passenger or passengers of an automobile to fasten their seat belts. Furthermore, the belt lock that is equipped according to the disclosure can also be used for activation or deactivation of mechanisms for inflating airbags for the passengers of an automobile. If there is no passenger in the vehicle, the airbags on the passenger side can be deactivated based on the detected locking status (unlocked).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A belt lock for a seat belt, comprising:
   a locking mechanism arranged in a belt lock housing for actuation when a belt lock tongue is inserted into the belt lock;
   the locking mechanism having a component that changes location from a first end position into a second end position upon actuation; and
   a mechanically operable electrical switch for detecting a locking status that interacts by direct contact with the component that changes location, wherein the mechanically operable electrical switch is arranged in a vicinity of the component that changes location for actuation and is actuated upon a movement of the component from the first end position into the second end position.

2. The belt lock according to claim 1, wherein the component that changes location is a clamp-like locking element pivotable around a pivoting axis that runs perpendicular to an insertion direction for the belt lock tongue, and wherein the mechanically operable electrical switch is arranged in a vicinity of a clamp arm of the locking element that runs parallel to the insertion direction.

3. The belt lock according to claim 1, wherein the component that changes location is a mandrel that can be moved axially parallel to an insertion direction when the locking mechanism is actuated.

4. The belt lock according to claim 2, wherein the mechanically operable electrical switch is arranged laterally to a path of motion of the clamp arm, and the clamp arm has means that during motion cause actuation of the mechanically operable electrical switch.

5. The belt lock according to claim 3, wherein the mandrel, in a free end region, has a lateral bevel that faces the mechanically operable electrical switch such that axial movement of the mandrel interacts with an operating projection on the mechanically operable electrical switch.

6. The belt lock according to claim 5, wherein the mechanically operable electrical switch comprises:
   two contact sheets that run roughly substantially parallel in a vicinity of one another, one of the contact sheets that is facing the mandrel being elastically supported to move and having an operating projection.

7. The belt lock according to claim 2, wherein the mechanically operable electrical switch is designed as an N/O contact.

8. The belt lock according to claim 2, wherein the clamp arm, in a free end region, has a laterally projecting cam arranged along a lengthwise extension, for interacting with two contact sheets of the mechanically operable electrical switch that are arranged laterally to a path of motion of the clamp arm.

9. The belt lock according to claim 8, wherein the mechanically operable electrical switch is designed as an N/O contact, and one of the contact sheets on which the cam acts is elastically pretensioned relative to another of the contact sheets in an opening direction.

10. The belt lock according to claim 8, wherein the mechanically operable electrical switch is designed as an N/C contact, at least one of the two contact sheets being elastically pretensioned in a closing direction relative to another of the contact sheets and the cam projecting into an intermediate space between the two contact sheets.

11. The belt lock according to claim 1, wherein the mechanically operable electrical switch is arranged in a switch housing.

12. The belt lock according to claim 11, wherein the mandrel is guided spatially by the switch housing.

13. The belt lock according to claim 1 comprising:
   an optical and/or acoustic warning signal.

14. The belt lock according to claim 1 comprising:
   at least one of activating or deactivating mechanisms for inflating airbags for the passengers of an automobile.

15. The belt lock according to claim 3, wherein the mechanically operable electrical switch is arranged laterally to a path of motion of the axially movable mandrel, and the mandrel along its lengthwise extension has means that during motion cause actuation of the mechanically operable electrical switch.

16. The belt lock according to claim 3, wherein the mandrel, in a free end region, has a laterally projecting cam arranged along a lengthwise extension, for interacting with two contact sheets of the mechanically operable electrical switch that are arranged laterally to a path of motion of the mandrel.

17. The belt lock according to claim 3, wherein the mechanically operable electrical switch is designed as an N/O contact.

18. The belt lock according to claim 4, wherein the mechanically operable electrical switch is designed as an N/O contact.

19. The belt lock according to claim 5, wherein the mechanically operable electrical switch is designed as an N/O contact.

20. The belt lock according to claim 16, wherein the mechanically operable electrical switch is designed as an N/O contact, and one of the two contact sheets on which the cam acts is elastically pretensioned relative to another of the second contact sheets in an opening direction.

* * * * *